No. 632,878. Patented Sept. 12, 1899.
E. W. McGUIRE.
ADJUSTABLE BALL BEARING DEVICE.
(Application filed Apr. 8, 1899.)
(No Model.)
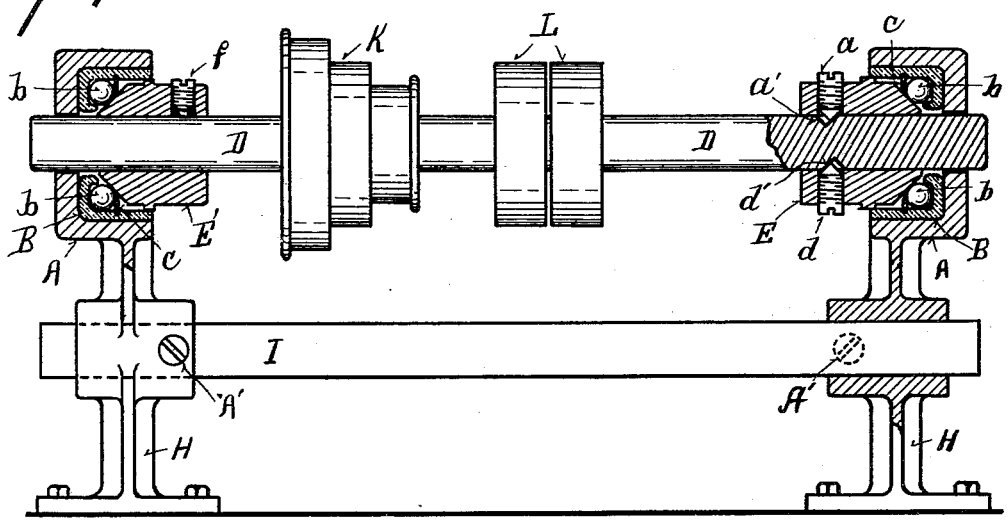
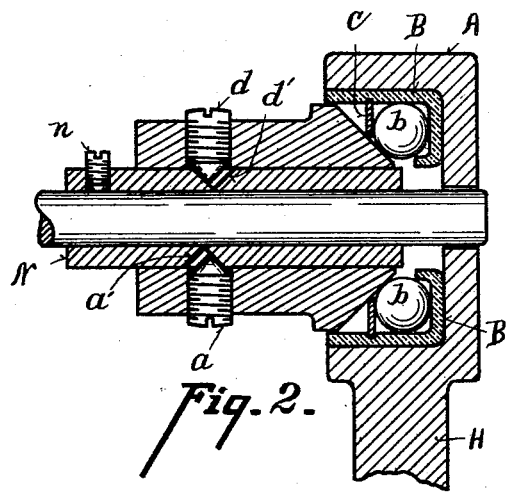
Witnesses
C. W. Miles.
Oliver B. Kaiser.
Inventor
Elwood W. McGuire
by Wood & Boyd
Attorneys

UNITED STATES PATENT OFFICE.

ELWOOD W. McGUIRE, OF RICHMOND, INDIANA.

ADJUSTABLE BALL-BEARING DEVICE.

SPECIFICATION forming part of Letters Patent No. 632,878, dated September 12, 1899.

Application filed April 8, 1899. Serial No. 712,210. (No model.)

*To all whom it may concern:*

Be it known that I, ELWOOD W. MCGUIRE, residing at Richmond, in the county of Wayne and State of Indiana, have invented certain new and useful Improvements in Adjustable Ball-Bearing Devices, of which the following is a specification.

The object of my invention is to first provide a counter-shaft with ball-bearings and ball-bearing-adjusting devices, whereby the bearings may be accurately adjusted longitudinally.

Another object of my invention is to provide means for adjusting the hanger-bearing longitudinally.

The features of my invention are more fully set forth in the description of the accompanying drawings, making a part of this specification, in which—

Figure 1 is a longitudinal elevation, partly in section, of my improvement. Fig. 2 is a central vertical section showing a modification of Fig. 1.

H represents brackets which are rigidly attached to the floor, ceiling, or the bed-plate of a machine. Brackets H are provided with eyes which engage the rod I, which is held in a fixed position upon the brackets H.

A represents the hanger-bearing, one end of each of which hangers is provided with a bearing fitting and engaging rod I. A' represents set-screws for holding these hanger-brackets in any adjustable position.

B represents the ball-bearing cups, which are provided with the annular groove, in which the balls $b$ seat and revolve.

E E' represent the cones, which bear against the balls in the usual manner.

$c$ represents the annular rings or ball-retainers for holding the balls in their seats.

The ball support or cone E' is rigidly secured to the shaft D by set-screw $f$. The cone or support E is adjustably secured to the shaft by means of the conical screw $a$ engaging a conical recess $a'$, formed in shaft D, and the conical screw $d$, engaging an opposing conical recess $d'$, set staggered on the opposite side of the shaft from $a'$. The conical screw $d$ presses the cone up against the balls. The conical screw $a$ moves the cone-bearing in the opposite direction. The adjustment is made by turning back one of these conical screws and turning in the opposite one. By this means the exact adjustment longitudinally of the ball-bearing cones is readily and accurately obtained.

The hangers are adjustable on the rod I for the purpose of regulating the support to the pulleys K L, enabling the bearings to be set up as close to the pulleys as necessary to prevent spring of the shaft.

In the modification Fig. 2 I have shown the conical recesses $a'$ $d'$ formed in a sleeve N, which in turn is held to the shaft in any approved manner—by set-screw $n$, for instance. This sleeve N might also be formed integral with the shaft, if desired.

Having described my invention, what I claim is—

1. In combination, a bearing comprising a cone, a part on which said cone is mounted provided with recesses staggered relatively to each other, and screws passing through said cone and adapted to bear on opposite sides of said recesses, substantially as set forth.

2. In combination with a counter-shaft, the rod I secured to stationary brackets, the ball-bearing hangers journaled to said rod, and the adjustable ball-bearing cones secured to the driving-shaft, substantially as specified.

In testimony whereof I have hereunto set my hand.

ELWOOD W. McGUIRE.

Witnesses:
WALTER HENDERSON,
GEO. H. EGGEMEYER.